US010701351B2

United States Patent
Komatsu et al.

(10) Patent No.: US 10,701,351 B2
(45) Date of Patent: Jun. 30, 2020

(54) VIRTUAL IMAGE DISPLAY DEVICE

(71) Applicant: SEIKO EPSON CORPORATION, Tokyo (JP)

(72) Inventors: Akira Komatsu, Tatsuno-machi (JP); Masayuki Takagi, Azumino (JP); Takashi Takeda, Suwa (JP); Toshiaki Miyao, Matsumoto (JP); Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/162,754

(22) Filed: Oct. 17, 2018

(65) Prior Publication Data
US 2019/0113755 A1 Apr. 18, 2019

(30) Foreign Application Priority Data

Oct. 18, 2017 (JP) ................ 2017-201616

(51) Int. Cl.
*H04N 13/344* (2018.01)
*G02B 27/01* (2006.01)
*H04N 13/00* (2018.01)

(52) U.S. Cl.
CPC ....... *H04N 13/344* (2018.05); *G02B 27/0172* (2013.01); *G02B 2027/014* (2013.01); *G02B 2027/015* (2013.01); *G02B 2027/0132* (2013.01); *G02B 2027/0138* (2013.01); *G02B 2027/0178* (2013.01); *H04N 2013/0088* (2013.01)

(58) Field of Classification Search
CPC ............. G02B 27/017; G02B 27/0172; G02B 27/0176; G02B 2027/0174; G02B 2027/0178; H04N 13/332–344
See application file for complete search history.

(56) References Cited

U.S. PATENT DOCUMENTS

| | | | |
|---|---|---|---|
| 5,734,505 A | 3/1998 | Togino et al. | |
| 5,844,713 A | 12/1998 | Nanba et al. | |
| 9,316,834 B2* | 4/2016 | Makino | G02B 27/017 |
| 10,175,487 B2* | 1/2019 | Benko | G02B 27/0172 |
| 10,288,885 B2* | 5/2019 | Makino | G02B 27/0172 |
| 2008/0316606 A1 | 12/2008 | Inoguchi et al. | |

(Continued)

FOREIGN PATENT DOCUMENTS

| | | |
|---|---|---|
| JP | H7-333549 A | 12/1995 |
| JP | H8-240786 A | 9/1996 |
| JP | 2009-3128 A | 1/2009 |

*Primary Examiner* — Gene W Lee
(74) *Attorney, Agent, or Firm* — Oliff PLC

(57) ABSTRACT

First display elements and first ocular optical systems perform display in a first display region on a front side with respect to an observer, whereas second display elements and second ocular optical systems perform display in second display regions on peripheral sides with respect to the observer. Thus, a superimposed region of the display regions is provided in a position outside a central side of a person's visual field having an excellent information receiving capacity, and a wide angle of view is achieved while preventing the boundary from being visually identified. Further, the whole device is reduced in size and thickness by providing the plurality of display elements.

14 Claims, 14 Drawing Sheets

(56) References Cited

U.S. PATENT DOCUMENTS

| | | | | |
|---|---|---|---|---|
| 2014/0266990 A1* | 9/2014 | Makino | ............... | G02B 27/017 345/8 |
| 2017/0115489 A1* | 4/2017 | Hu | ................... | G02B 27/0172 |
| 2017/0285344 A1* | 10/2017 | Benko | ............... | G02B 27/0172 |
| 2017/0371162 A1* | 12/2017 | Makino | .............. | G02B 27/0172 |

* cited by examiner

VIRTUAL IMAGE DISPLAY DEVICE

BACKGROUND

1. Technical Field

The invention relates to a virtual image display device that presents a video to an observer, and more particularly, to a virtual image display device that emits image light emitted from a plurality of display elements.

2. Related Art

In recent times, an angle of view has been widening in virtual image display devices such as head-mounted displays (hereinafter also referred to as HMDs) and the like. A wide display angle of view is indispensable particularly in HMDs for VR. Thus, virtual image display devices tend to include a long optical system and have such a shape that a lens and a display element protrude to the front of a face. A reduced size of a display element shortens a total length of an optical system. However, power of the optical system increases, and thus it is difficult to maintain good display quality. On the contrary, it has been known that a display screen is divided into several screens and the screens are connected (for example, see JP-B-3363647, JP-A-7-333549, JP-A-2009-3128).

However, a boundary (superimposed region) between divided image regions may be clearly seen by an observer. Particularly when the boundary is located on a central side of a person's visual field having an excellent information receiving capacity, the boundary is highly likely to be more conspicuous.

SUMMARY

An advantage of the invention is to provide a virtual image display device capable of achieving a wide angle of view and a reduction in size and thickness while preventing a boundary between divided image regions from being visually identified.

A virtual image display device according to an aspect of the invention includes a first display element configured to emit image light of a first component corresponding to a first display region on a front side of an observer viewing from the front when being worn, a second display element configured to emit image light of a second component corresponding to a second display region being partially superimposed on a peripheral side of the first display region, a first ocular optical system configured to emit the image light of the first component emitted from the first display element to a position corresponding to an eye of an observer, and a second ocular optical system configured to emit the image light of the second component emitted from the second display element to a position corresponding to the eye of the observer. The first display element and the first ocular optical system are a pair of configurations provided in association with left and right eyes of the observer, and a pair of the first display elements perform image display of a common content in the first display region. The second display element performs individual image display in the second display region.

In the above-described virtual image display device 200, first, while the first display element and the first ocular optical system perform display (display in the first display region) on the front side with respect to the observer, the second display element and the second ocular optical system perform display (display in the second display region) on the peripheral side with respect to the observer for each of the left and right eyes of the observer. In this way, a boundary portion connecting the display, namely, a superimposed region, is provided in a position outside a central side of a person's visual field having an excellent information receiving capacity. In other words, a wide angle of view of an image can be achieved while preventing the boundary (superimposed region) from being visually identified. Further, the device includes the plurality of display elements, and small display elements can be adopted, and thus the whole device can be reduced in size and thickness. Furthermore, the first display element and the first ocular optical system having the above-described configuration are provided in a pair corresponding to the left and right eyes of the observer. At this time, in the first display region being display on the front side with respect to the observer, the image display of a content common to the left and right eyes is performed. In the second display region being display on the peripheral side, the individual image display is performed. In this way, the observer connects the images in the head, and can thus visually identify an image at a wider angle of view.

In a specific aspect of the invention, the second display element and the second ocular optical system are a pair of configurations provided in association with the left and right eyes of the observer, and a pair of the second display elements separately perform individual image display in the second display region. In this case, the individual image display can be separately performed on the right eye side and the left eye side. Thus, the observer connects the images viewed with the left and right eyes in the head, and can thus visually identify an image at a wider angle of view.

In another aspect of the invention, the first display region includes a range assumed to be passed through by a visual axis of the observer viewing from the front when being worn. In this case, a range in a person's visual field having an excellent information receiving capacity can be included within the first display region.

In still another aspect of the invention, the first display region includes a range assumed as a stable field of fixation of the observer viewing from the front when being worn. In this case, a region in the person's visual field, in which the observer naturally pays close attention with eyes and head movements and receives effective information, can be included within the first display region.

In still another aspect of the invention, a superimposed region or a boundary portion of the first display region and the second display region is disposed on a peripheral side with respect to the range assumed as the stable field of fixation of the observer viewing from the front when being worn. In this case, a boundary between the image regions can be prevented from being visually identified by disposing the superimposed region outside the region in the person's visual field, in which the observer naturally pays close attention with eyes and head movements and receives effective information.

In still another aspect of the invention, a refresh rate of the first display element is higher than a refresh rate of the second display element. In this case, a smoother moving image can be displayed in the image display on the first display element side, and image processing in the image display of the second display element can be reduced.

In still another aspect of the invention, a resolution of the first display element is higher than a resolution of the second display element. In this case, an image with a higher degree of definition can be provided in the image display on the first display element side.

In still another aspect of the invention, a visual field angle characteristic of the second display element is wider than a visual field angle characteristic of the first display element. In this case, the component of the image light on the peripheral side can be reliably emitted toward an eye of the observer.

In still another aspect of the invention, the first display element and the second display element each include a polygonal panel having three or more vertexes. In this case, distortion around an image due to a wide angle of view can be reduced.

In still another aspect of the invention, the first display region and the second display region are arranged in a lateral direction in which eyes are aligned with the second display region on an outer edge side. In this case, an image can be formed at a wide angle of view in the lateral direction in which the eyes are aligned.

In still another aspect of the invention, the second display element includes a plurality of display element sections, and the second display region is formed such that a plurality of divided display regions corresponding to the plurality of display element sections are adjacent to each other with a superimposed region or a boundary portion being provided. In this case, the second display region includes the plurality of divided display regions, and thus a smaller member can be used on the display element side.

In still another aspect of the invention, the plurality of divided display regions corresponding to the plurality of display element sections are arranged in a lateral direction in which eyes are aligned or a longitudinal direction orthogonal to the lateral direction in which eyes are aligned. In this case, an image can be formed at a wider angle of view in the lateral direction in which the eyes are aligned and the longitudinal direction orthogonal to the lateral direction.

In still another aspect of the invention, the virtual image display device further includes a third display element configured to emit image light of a third component corresponding to a third display region partially superimposed on a peripheral side of the first display region. The third display elements are a pair of configurations provided in association with left and right eyes of the observer, and perform image display of a common content in the third display region. In this case, a range in which the image display of a common content is performed can be expanded.

In still another aspect of the invention, the number of superimposition of a region at an identical place between the display regions is less than or equal to three. In this case, the superimposed region can be prevented from being conspicuous while ensuring flexibility in disposition of each region and avoiding superimposition of many display regions.

In still another aspect of the invention, the first display element and the second display element are any of an organic EL display device, a liquid crystal display device, and a laser scan-type display device.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Exemplary Embodiment

Hereinafter, a virtual image display device in First Exemplary Embodiment according to the invention will be described with reference to drawings. Note that, in FIG. 1 and the like, X, Y, and Z represent three axes in the rectangular coordinate system, X corresponds to a direction corresponding to a visual axis direction in a front view, Y corresponds to a lateral direction in which a pair of eyes of an observer in an upright position are aligned or a horizontal direction, and Z corresponds to a vertical direction vertical to the lateral direction in which the eyes are aligned and the visual axis in the front view.

Figure 1:
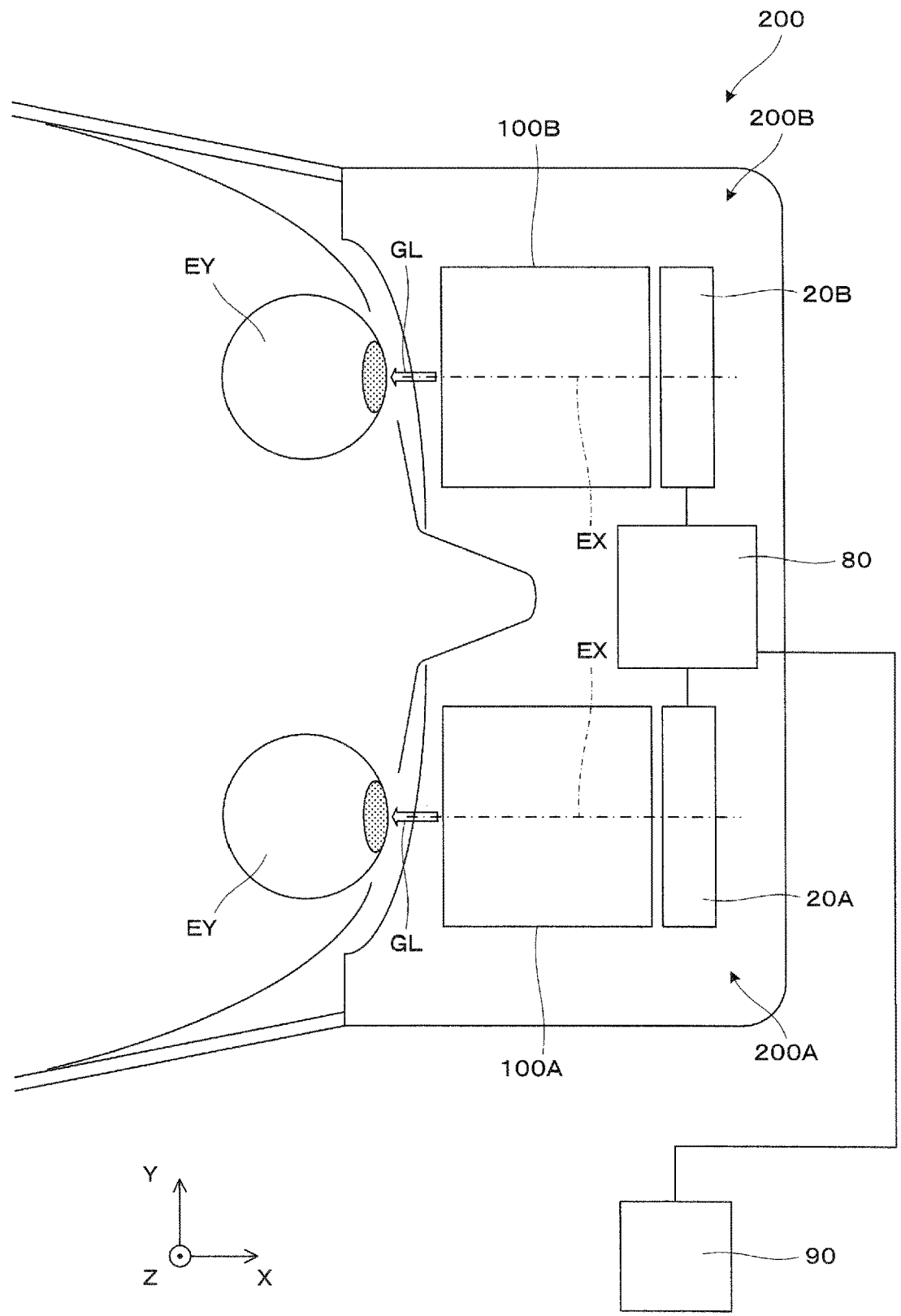
FIG. 1 is a schematic plan view for describing a virtual image display device in First Exemplary Embodiment.

A virtual image display device 200 illustrated in FIG. 1 is an eyeglass-type head-mounted display, and includes a left-and-right pair of image display units 200A and 200B, a control circuit unit 80 configured to control display action and the like of both the image display units 200A and 200B, and an operation control unit 90 configured to receive an operation of a user and work in cooperation with the control circuit unit 80. The virtual image display device 200 is an image display device configured to emit video light GL as image light causing a virtual image to be visually identified to positions assumed as positions of both eyes EY and EY of an observer who is a user or a wearer and thus cause the observer to recognize various images such as a moving image and a still image and the like.

The image display unit 200A for a right eye includes a display section 20A and an ocular optical system 100A. The image display unit 200B for a left eye includes a display section 20B and an ocular optical system 100B. The image display units 200A and 200B are coupled to the control circuit unit 80, and work to display an image according to various signals from the control circuit unit 80. Note that, the observer can perform various operations including, for example, transmitting a calibration request to the control circuit unit 80 and the like by operating the operation control unit 90.

Hereinafter, each configuration in the optical system will be described and a state of an image visually identified by the observer will also be described with reference to FIG. 2 and the like. Note that, in First Exemplary Embodiment, each configuration in the optical system has a symmetrical configuration in a left-and-right pair.

Figure 2:
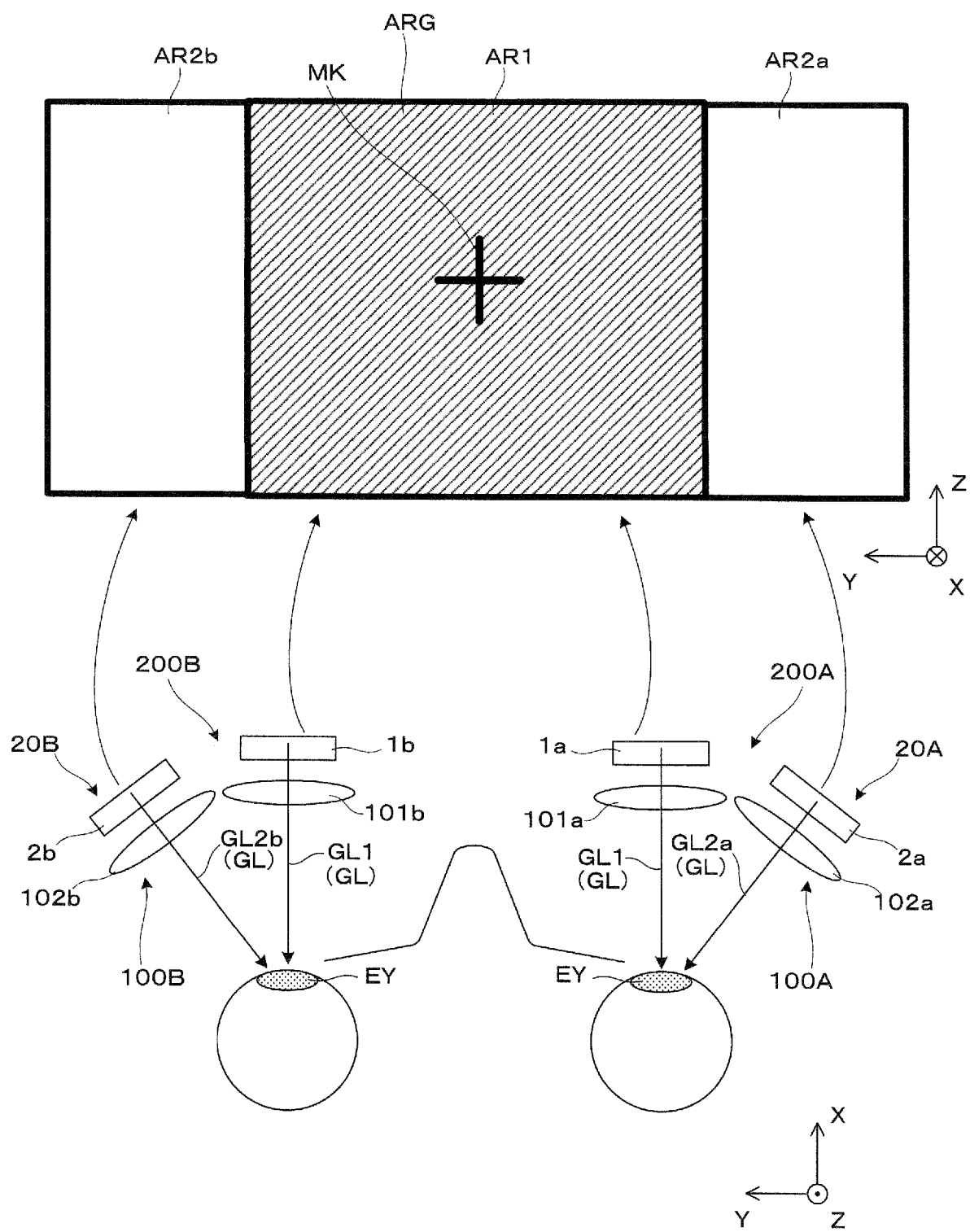
FIG. 2 is a diagram illustrating a relationship between a left-and-right pair of optical systems and corresponding display regions.

To begin with, as illustrated in FIG. 2, first, the display section 20A in the image display unit 200A for a right eye includes a first display element 1a and a second display element 2a that are video elements configured with a panel and the like. The ocular optical system 100A includes a first ocular optical system 101a provided on a subsequent stage in an optical path of the first display element 1a, namely, on a downstream side in the optical path and a second ocular optical system 102a provided on a subsequent stage in an optical path (on a downstream side in the optical path) of the second display element 2a. Similarly, in the image display unit 200B for a left eye, the display section 20B includes a first display element 1b and a second display element 2b, and the ocular optical system 100B includes a first ocular optical system 101b and a second ocular optical system 102b. Note that, these display elements 1a, 2a, 1b, and 2b can be configured with, for example, an organic EL display device, a liquid crystal display device, a laser scan-type display device, and the like.

With the above-described four display elements 1a, 2a, 1b, and 2b and four ocular optical systems 101a, 102a, 101b, and 102b, the virtual image display device 200 allows the observer to visually identify a first display region AR1 on a front side of the observer and two second display regions AR2a and AR2b on peripheral sides as if one connected integrated display region ARG is present.

To specifically describe the configuration above, first, the first display element 1a for a right eye and the first display element 1b for a left eye are disposed on the front side with respect to the corresponding left and right eyes EY and EY of the observer when being worn, and each emit, as the video light GL, a first component GL1 corresponding to the first display region AR1 on the front side of the observer viewing from the front. In the eyes EY and EY of the observer, the first component GL1 from the first display elements 1a and 1b passes through the first ocular optical systems 101a and 101b and is visually identified as an enlarged virtual image. As described above, an image of a content common to the image light of the first component GL1 from the first display element 1a for a right eye and the image light of the first component GL1 from the first display element 1b for a left eye is formed, and thus it is recognized such that one image is seen with both eyes. In other words, the first display region AR1 represents a display range visually identified as one image as a virtual image in FIG. 2. At this time, the first display region AR1 includes a range (a margin taking individual differences in visual axes into account) assumed to be passed through by visual axes of the eyes EY and EY (for example, a visual axis EX of the right or left eye EY looking at the front in FIG. 1) of the observer viewing from the front when being worn. In other words, a range and a direction of an angle at which the first component GL1 is emitted correspond to a range and a direction of an assumed angle of each of the visual axes of the eyes EY and EY in the front view. For example, various image processing is performed such that an indicator MK (central position of video content) being the center of a video indicated by a cross mark in FIG. 2 is disposed in the central position of the first display region AR1, and thus a standard visual axis direction of the eyes EY and EY is directed to the indicator MK in the front. Further, as a standard state, for example, a case where contents of video display corresponding to left and right eyes are adjusted such that the visual axis direction of the observer is +X direction and a case where contents of video display are adjusted such that the visual axis of the right eye EY is +X direction slightly inclined to −Y direction and the visual axis of the left eye EY is +X direction slightly inclined to +Y direction with consideration given to characteristics of the left and right eyes are conceivable. Note that, in either case, the first display region AR1 is displayed so as to occupy a range to some extent on the front side of the observer, and thus the first display region AR1 can include a range assumed to be passed through by the visual axes of the observer viewing from the front when being worn.

Next, the second display element 2a for a right eye is disposed on the peripheral side with respect to the corresponding right eye EY of the observer when being worn, more specifically, on an outer edge side close to a right ear (not illustrated) of the observer, and emits, as the video light GL, a second component GL2a corresponding to the second display region AR2a on the peripheral side (outer edge side) on the right side (−Y side) of the observer viewing from the front. In the right eye EY of the observer, the second component GL2a from the second display element 2a passing through the second ocular optical system 102a is visually identified as an enlarged virtual image. As described above, the image light of the second component GL2a from the second display element 2a for a right eye performs individual image display separately from other image light. In other words, the second display region AR2a represents a display range visually identified with just the right eye as one image as a virtual image in FIG. 2.

Similarly, the second display element 2b for a left eye is disposed on an outer edge side close to a left ear (not illustrated) of the observer, and emits, as the video light GL, a second component GL2b corresponding to the second display region AR2b on the peripheral side (outer edge side) on the left side (+Y side) of the observer viewing from the front. In the left eye EY of the observer, the second component GL2b from the second display element 2b passing through the second ocular optical system 102b is visually identified as an enlarged virtual image. As described above, the image light of the second component GL2b from the second display element 2b for a left eye performs individual image display separately from other image light. In other words, the second display region AR2b represents a display range visually identified with just the left eye as one image as a virtual image in FIG. 2.

Herein, in the image display unit 200A for a right eye, each of the optical systems is disposed so as to generate an image in which the peripheral side of the first display region AR1 and the second display region AR2a are partially superimposed on each other and connected. Similarly, in the image display unit 200B for a left eye, each of the optical systems is disposed so as to generate an image in which the peripheral side of the first display region AR1 and the second display region AR2b are partially superimposed on each other and connected. In other words, the first display region AR1 and the second display regions AR2a and AR2b are arranged in the lateral direction (horizontal direction; Y direction) in which eyes are aligned with the second display regions AR2a and AR2b are on the respective outer edge sides. As described above, as illustrated in FIG. 2, the integrated display region ARG having one first display region AR1 at the central portion and the second display regions AR2a and AR2b connected to the left and right of the first display region AR1 and extending is visually identified by the observer.

Figure 3:
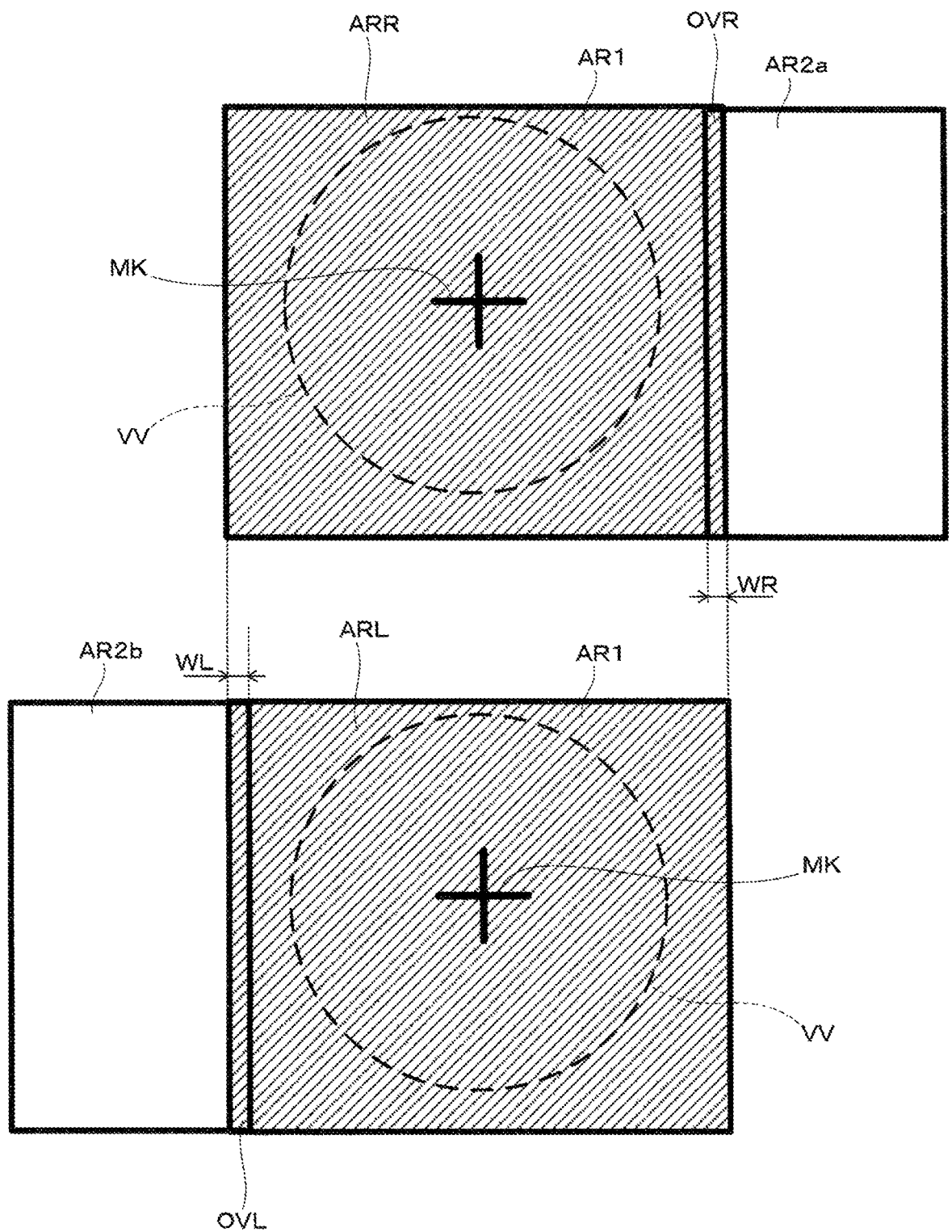
FIG. 3 is schematic diagrams each illustrating a state of a display region visually identified with one of eyes in the virtual image display device.

FIG. 3 is schematic diagrams illustrating a state of a display region visually identified with one of eyes. One illustrates a right eye side-display region ARR visually identified with the right eye of the observer. The other illustrates a left eye side-display region ARL visually identified with the left eye of the observer. In other words, the right eye side-display region ARR is a display region including the first display region AR1 and the second display region AR2a, and the left eye side-display region ARL is a display region including the first display region AR1 and the second display region AR2b. The display regions ARR and ARL respectively have superimposed regions OVR and OVL each being a joint, namely, a boundary as described above. Note that, FIG. 3 illustrates the superimposed regions OVR and OVL being exaggerated with greater horizontal widths WR and WL to facilitate understanding, but the superimposed regions OVR and OVL are actually thin linear regions. The superimposed regions OVR and OVL (joints, boundaries) are likely to be clearly seen by the observer, and is highly likely to be more conspicuous particularly when the superimposed regions OVR and OVL are located on a central side of a person's visual field having an excellent information receiving capacity.

On the other hand, an effective visual field of the person's visual field having the excellent information receiving capacity is at about 30° horizontally and 20° vertically. Further, a stable field of fixation in which the observer can naturally pay close attention with eyes and head movements and receive effective information is at about 60 to 90° horizontally and 45 to 70° vertically. Thus, it is conceivable that a region that can be visually identified as information in an actually seen visual field is about 30° at most. It is significant to maintain a high resolution of this region from a viewpoint of ensuring good visibility while widening an angle of view. Furthermore, it is conceivable that a joint or a boundary formed by the superimposed region as described above is less likely to be visually identified in a range at a greater than or equal to 60°. Moreover, When an HMD having such an advanced wide angle of view as to exceed a FOV (angle of view) 50°, a known head tracking function, for example, is often provided, and an observer attempts to move a head instead of eyes when the observer wants to see a peripheral portion. Thus, an observer's line of sight is constantly directed around the center of an image and is rarely directed to the peripheral portion. Therefore, for image display, a region that needs a resolution is limited to a central side-region in the image display, and a peripheral side-region does not need a resolution so much.

In First Exemplary Embodiment, the optical systems in the virtual image display device 200 have the above-mentioned configurations with consideration given to the above-described viewpoint. Thus, it is assumed that the optical system including the first display elements 1a and 1b takes on the responsibility of forming a main image on the central side, and the optical system including the second display elements 101a and 101b takes on the responsibility of the peripheral sides for further expanding a FOV (angle of view), namely, a range that can be visually identified by the observer. In this case, the FOV of, for example, the first display region AR1 being a range of an image visually identified by the observer by the first display elements 1a and 1b is sufficiently increased, and thus visibility of the superimposed regions OVR and OVL corresponding to the peripheral portions of the first display region AR1 can be reduced. Herein, as one example, a thought is given to, for example, a region of a stable field of fixation in a range concerned with the above-described person's visual field. Specifically, with a standard position (for example, the center of the cross indicator MK or a position through which a standard visual axis passes) of the observer viewing from the front when bring worn as a reference to an angle of view (visual field angle) of 0°, the pair of image display units 200A and 200B are formed such that the first display region AR1 includes a region VV corresponding to a range assumed as a stable field of fixation. Furthermore, the pair of image display units 200A and 200B are formed such that the superimposed regions OVR and OVL are disposed on the peripheral sides with respect to the region VV. In this way, the superimposed regions OVR and OVL being the boundaries of the image region can be further prevented from being visually identified.

Note that, as described above, the region VV is a region corresponding to a range assumed as a stable field of fixation, but the invention is not limited to this. For example, assuming that an effective visual field at about 30° horizontally and 20° vertically having an excellent information receiving capacity is the region VV, the pair of image display units 200A and 200B may be conceivably formed such that the first display region AR1 includes the region VV.

Hereinafter, the virtual image display device 200 in one modified example will be described with reference to FIG. 4 and the like. As described above, with consideration given to that a range in the person's visual field having the excellent information receiving capacity is limited, the two second display regions AR2a and AR2b on the peripheral sides may not need an image as fine as the image of the first display region AR1. On the other hand, it is expected that the two second display regions AR2a and AR2b form an image at a wider angle of view by being expanded.

Figure 4:
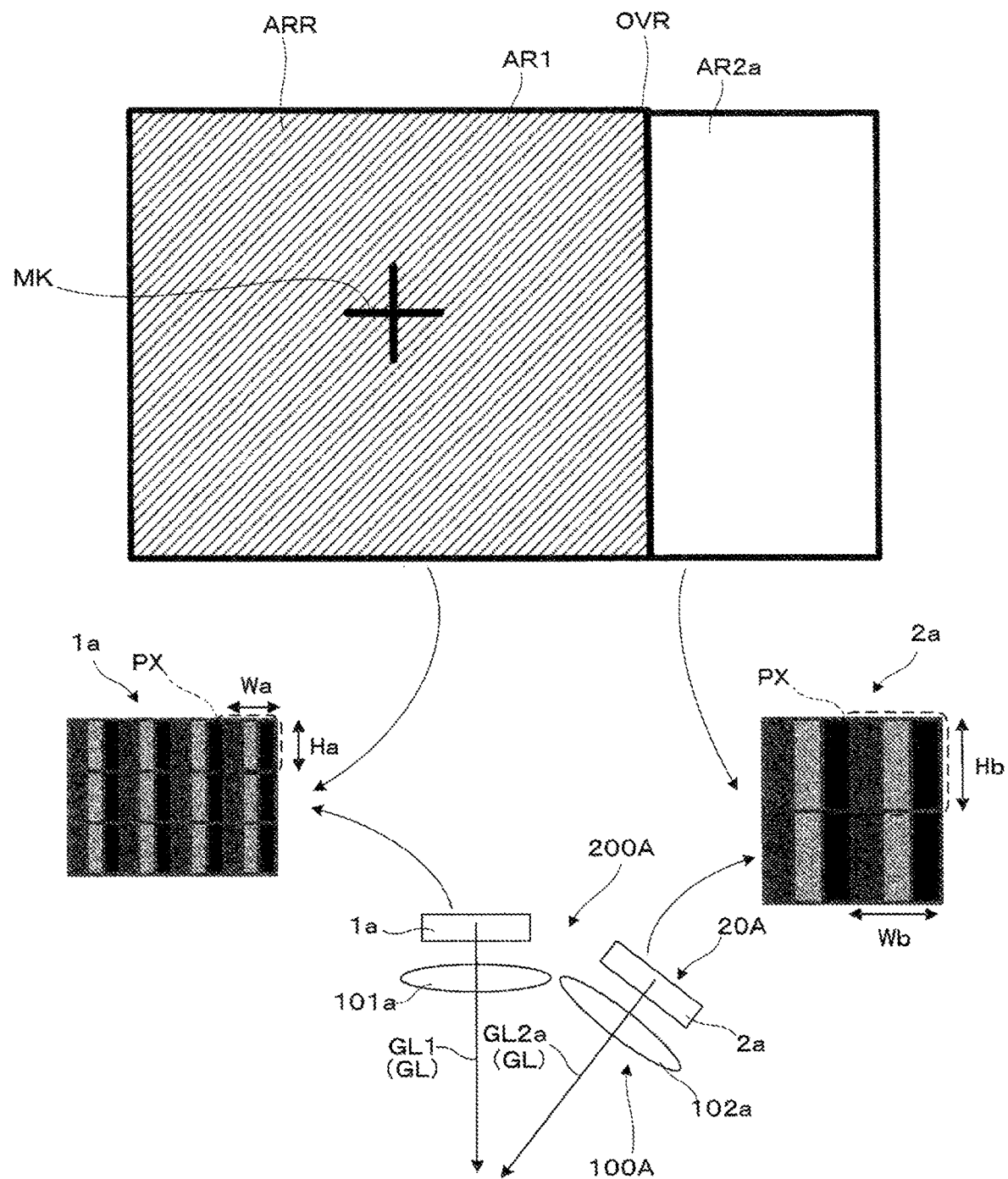
FIG. 4 is a diagram for describing a pixel structure in one modified example of a display element.

Thus, in the example of FIG. 4, in the display section 20A constituting the image display unit 200A, the first display element 1a contributing to image formation of the first display region AR1 and the second display element 2a contributing to image formation of the second display region AR2a vary in resolution. Specifically, longitudinal and latitudinal widths H1 and W1 of each pixel PX constituting the first display element 1a are smaller than longitudinal and latitudinal widths H2 and W2 of each pixel PX constituting the second display element 2a. In other words, the resolution of the first display element 1a is higher than the resolution of the second display element 2a. In this case, an image with a higher degree of definition can be provided in the image display on the first display element side. Further, a wider angle of view can be achieved by increasing the size of one pixel in the second display element. Note that, various degrees of each width are conceivable, and, for example, it is conceivable that the widths are approximately twice, that is, $W2 = 2 \times W1$ and $H2 = 2 \times H1$ approximately.

Further, the display section 20B constituting the image display unit 200B, that is, the first display element 1b contributing to image formation of the first display region AR1 and the second display element 2b contributing to image formation of the second display region AR2b may be in the same aspect, and detailed description will be omitted.

Figure 5:
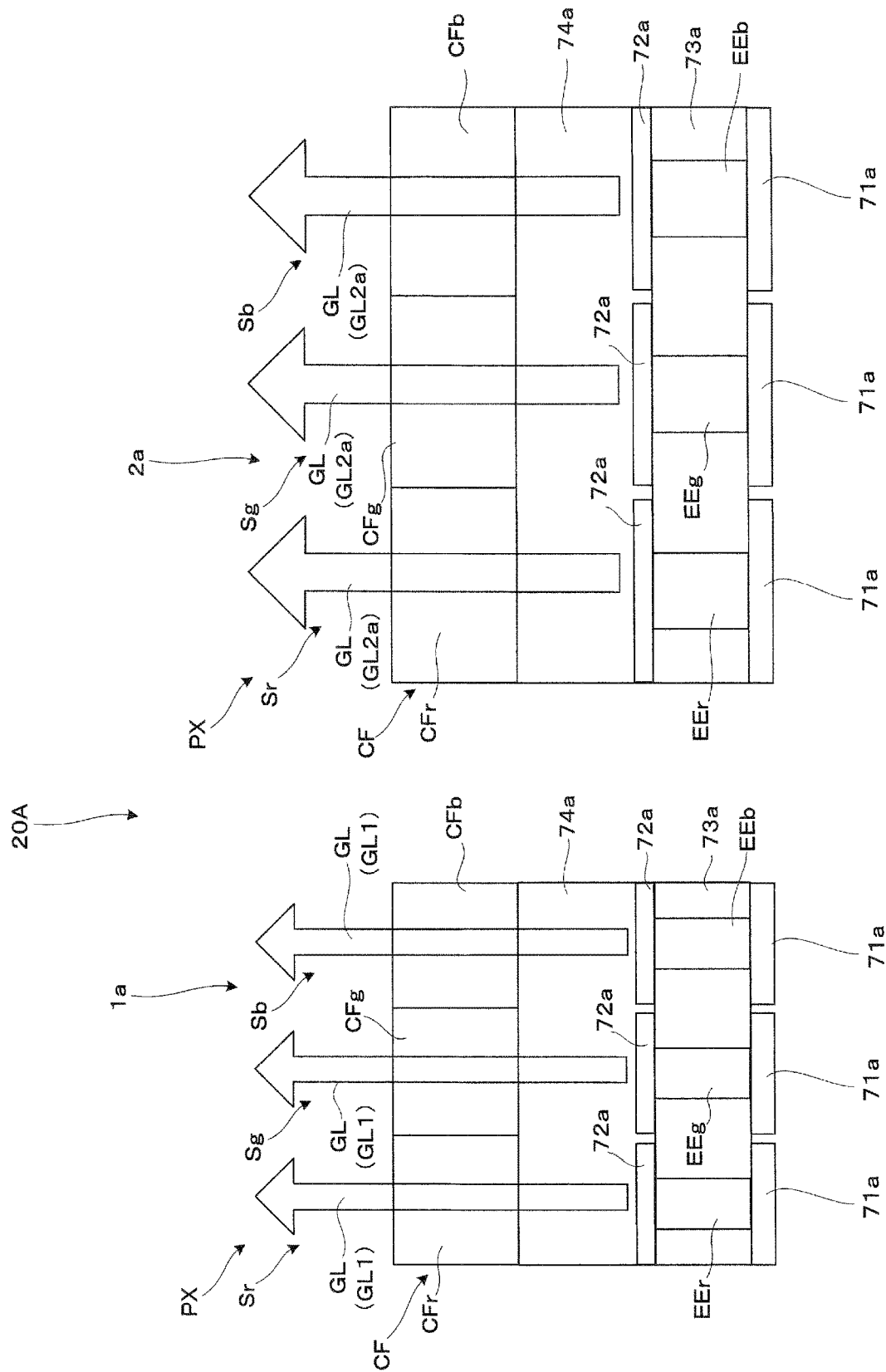
FIG. 5 is a diagram for describing an internal structure in one modified example of the display element.

Furthermore, when the size of the pixel PX is changed as described above, the first display element 1a and the second display element 2a may vary in visual field angle characteristics as illustrated in FIG. 5, for example.

As exemplified in FIG. 5, the first display element 1a and the second display element 2a constituting the display section 20A in the image display unit 200A each include a color filter layer CF, a plurality of transparent electrodes (anodes) 71a being pixel electrodes, a plurality of counter electrodes (cathodes) 72a, an organic EL layer 73a including light-emitting layers EEr, EEg, and EEb in respective colors being light-emitting functional layers disposed between the transparent electrodes 71a and the counter electrodes 72a, and a protective layer 74a. The color filter layer CF is formed on the protective layer 74a. The color filter layer CF includes a color filter portion CFr for red, a color filter portion CFg for green, and a color filter portion CFb for blue. The color filter portions CFr, CFg, and CFb for the respective colors correspond to the plurality of transparent electrodes (anodes) 71a being the pixel electrodes and are arranged in matrix. In the configuration as described above, the display elements 1a and 2a respectively cause the electrodes 71a and 72a to work as appropriate, cause the organic EL layer 73a including the light-emitting layers EEr, EEg, and EEb to emit light, and then emit the video light GL (or the components GL1 and GL2a of the image light GL).

The first display element 1a constituting the central side-region and the second display element 2a constituting the peripheral side-region vary in size according to the size of the pixel PX (sub-pixels Sr, Sg, and Sb) to be indispensable. In other words, the size of each portion constituting one pixel PX is greater in the second display element 2a than that in the first display element 1a. Note that, in the illustrated example, the size of the light-emitting layers EEr, EEg, and EEb in the respective colors increases with an increase in the size of one pixel PX.

Herein, the first component GL1 emitted from the first display element 1a has a relatively small angle of main light beam. Thus, for example, even when visual field angle characteristics are relatively narrow and peaky characteristics, a decrease in brightness and a change in color are less likely to occur. On the other hand, the second display element 2a emits the component GL2a to be light from the peripheral side-region. At this time, the size of the pixel PX is great. In other words, the size of the color filter portions CFr, CFg, and CFb constituting the second display element 2a is greater than that in the first display element 1a. In this way, the visual field angle characteristics can also relatively wider. Further, in this case, even when the component of the image light from the second display element 2a has a relatively great angle of main light beam, for example, the component can be reliably emitted toward an eye of the observer.

Further, the display section 20B constituting the image display unit 200B, that is, the first display element 1b emitting the first component GL1 and the second display element 2b emitting the second component GL2b may be in the same aspect, and detailed description will be omitted.

Figure 6:
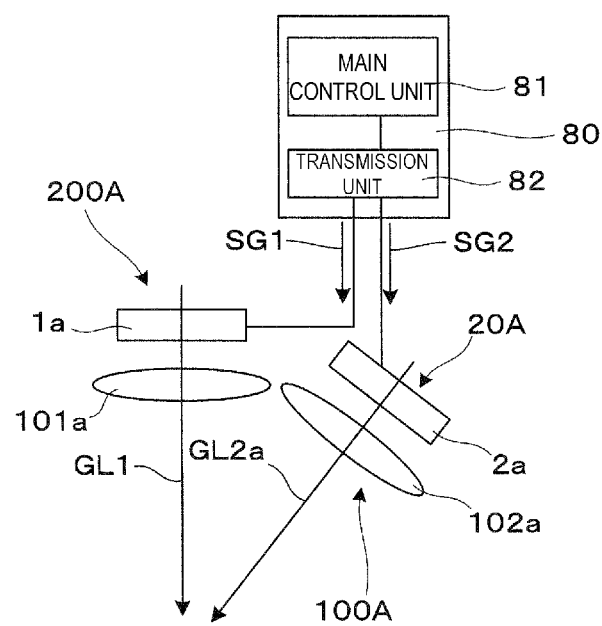
FIG. 6 is a diagram for describing one example of a state of signal transmission in the virtual image display device.

Hereinafter, the virtual image display device 200 in another one modified example will be described with reference to FIG. 6. Note that, herein, just the display section 20A on the right eye side in the virtual image display device 200 will be described due to the left-right symmetry, and description of the left eye side will be omitted.

As already described, the person's visual field having the excellent information receiving capacity is limited, and thus it is also conceivable that, for example, smoothness of motion of a moving image and the like on the peripheral side also do not need precision as fine as precision on the central side. Thus, in the display section 20A in the virtual image display device 200 in the example of FIG. 6, the first display element 1a and the second display element 2a vary in refresh rate indicating a frequency of refresh timing of a display image (moving image). To describe specifically, first, the control circuit unit 80 includes a main control unit 81 being a principal portion and configured to perform the whole integration control and transmit various generated signals to each unit via a transmission unit 82. For transmission, the main control unit 81 has a higher frequency of transmitting a first signal SG1 being various signals such as a video signal to be transmitted to the first display element 1a than a frequency of transmitting a second signal SG2 being various signals such as a video signal to be transmitted to the second display element 2a. For example, the frequency of transmitting the first signal SG1 is conceivably twice the frequency of transmitting the second signal SG2. As described above, when the refresh rate of the first display element 1a is higher than the refresh rate of the second display element 2a, a smoother moving image can be displayed in the image display on the first display element 1a side, and a load on the image processing in the image display of the second display element 2a can be reduced. Note that, the main control unit 81 includes, for example, a control circuit that enables image processing, such as a CPU, a GPU, a Soc, and a FPGA and the like, and further includes a driver and the like for causing each of the display elements to work in order to achieve control of the above-described operations.

As described above, in the virtual image display device 200 according to First Exemplary Embodiment, first, the first display elements 1a and 1b and the first ocular optical systems 101a and 101b perform display in the first display region AR1 on the front side with respect to the observer for each of the left and right eyes EY and EY of the observer. On the other hand, the second display elements 2a and 2b and the second ocular optical systems 102a and 102b perform display in the second display regions AR2a and AR2b on the peripheral sides with respect to the observer. As described above, boundary portions, namely, the superimposed regions OVR and OVL connecting the display in the first display region AR1 and the second display regions AR2a and AR2b can be provided in positions outside the central side of the person's visual field having the excellent information receiving capacity. In other words, a wide angle of view of an image can be achieved while preventing the boundaries (superimposed regions OVR and OVL) from being visually identified. Further, the device includes the plurality of display elements 1a, 1b, 2a, and 2b, and small display elements can be adopted in each display element, and thus the whole device can be reduced in size and thickness of the device. Furthermore, the first and second display elements 1a, 1b, 2a, and 2b and the first and second ocular optical systems 101a, 101b, 102a, and 102b having the above-described configurations are provided in pairs corresponding to the left and right eyes of the observer. In the first display region AR1 being display on the front side with respect to the observer, the image display of a content common to the left and right eyes is performed. In the second display regions AR2a and AR2b being display on the peripheral sides, the individual image display is separately performed on the right eye side and the left eye side. In this way, the observer connects the images viewed with the left and right eyes in the head, and can thus visually identify an image at a wider angle of view. In other words, the observer visually identifies an image as if the one connected integrated display region ARG is present.

Second Exemplary Embodiment

Hereinafter, a virtual image display device in Second Exemplary Embodiment will be described. The virtual image display device in Second Exemplary Embodiment is modified from the virtual image display device in First Exemplary Embodiment, and description of a portion common to that in First Exemplary Embodiment will be omitted.

Figure 7A:
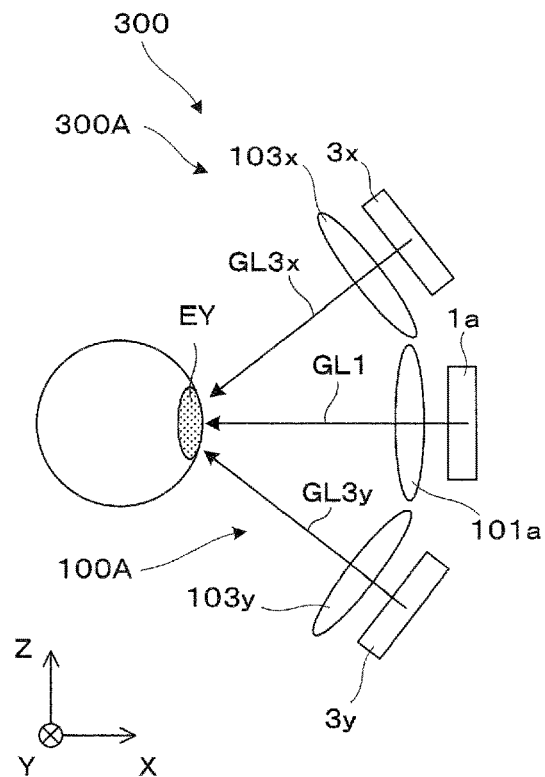
FIG. 7A is a schematic diagram for describing a virtual image display device in Second Exemplary Embodiment.
Figure 7B:
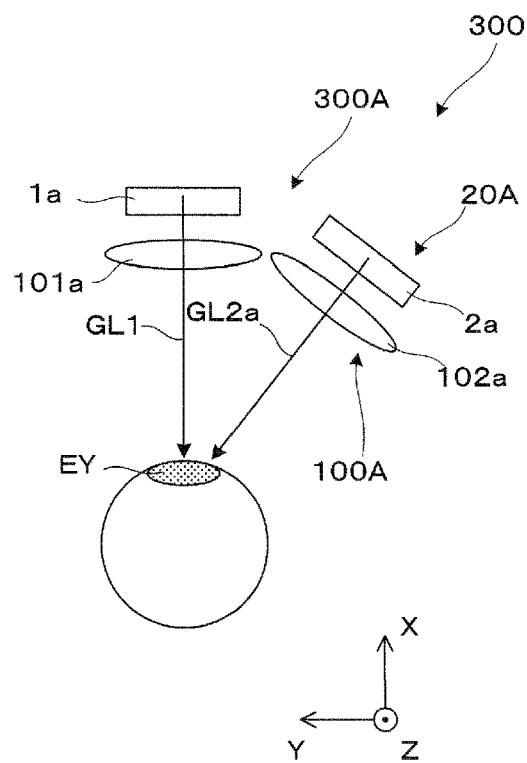
FIG. 7B is a schematic diagram for describing the virtual image display device in Second Exemplary Embodiment.
Figure 8:
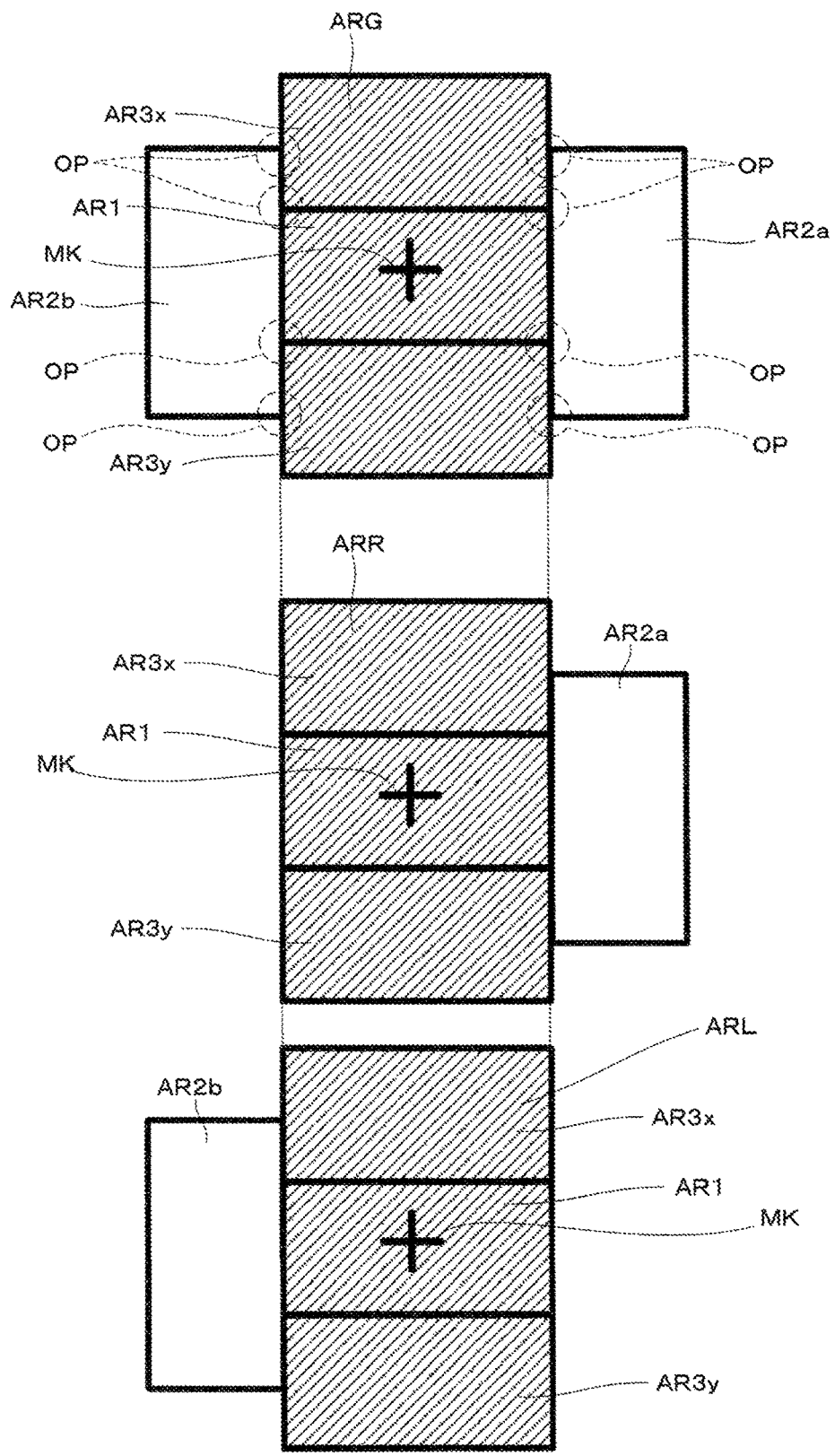
FIG. 8 is a schematic diagram illustrating a state of a display region visually identified in the virtual image display device.

FIGS. 7A and 7B are schematic diagrams for describing a virtual image display device 200 in Second Exemplary Embodiment. FIG. 8 is a schematic diagram illustrating a state of a display region visually identified in the virtual image display device 300. In Second Exemplary Embodiment, as illustrated in FIGS. 7A and 7B, an image display unit 300A constituting a display portion for a right eye in the virtual image display device 300 includes third display elements 3x and 3y and third ocular optical systems 103x and 103y provided in association with the third display elements 3x and 3y in addition to the first and second display elements 1a and 2a and the first and second ocular optical systems 101a and 102a, which is different from First Exemplary Embodiment.

Hereinafter, the virtual image display device 300 in Second Exemplary Embodiment will be described in detail with reference to FIG. 7A and the like. Note that, FIGS. 7A and 7B illustrate just the right eye side of a configuration of an optical system (image display unit) due to left-right symmetry (namely, a left-and-light pair of configurations).

First, as described above, as illustrated in FIGS. 7A and 7B, the image display unit 300A in the virtual image display device 300 includes the third display elements 3x and 3y in addition to the first second display elements 1a and 2a as the display section 20A, and includes the third ocular optical systems 103x and 103y as the ocular optical system 100A. Particularly, as illustrated in FIG. 7A, the third display elements 3x and 3y and the third ocular optical systems 103x and 103y are arranged in an up-and-down direction, namely, Z direction. The third display element 3x and the third ocular optical system 103x are disposed on an upper side (+Z side) of the first display element 1a. The third display element 33y and the third ocular optical system 103y are disposed on a lower side (−Z side) of the first display element 1a. In this way, the third display element 3x emits, as the image light GL, a third component GL3x corresponding to a third display region AR3x (see FIG. 8) on a peripheral side (outer edge side) on the upper side (+Z side) of the central side of the observer viewing from the front. Similarly, the third display element 3y emits, as the image light GL, a third component GL3y corresponding to a third display region AR3y (see FIG. 8) on a peripheral side (outer edge side) on the lower side (−Z side) of the central side of the observer viewing from the front.

Note that, although illustration and description will be omitted, an optical system on the left eye side also includes the same third display elements and third ocular optical systems as those described above. In other words, it is assumed that the same third display elements and third ocular optical systems as those described above are disposed on the upper side (+Z side) and the lower side (−Z side) of the first display element. It is particularly assumed herein that an image of a content common to the left and right is formed by the image light from the third display elements disposed on the upper side (+Z side), and an image of a content common to the left and right is formed by the image light from the third display elements disposed on the lower side (−Z side). In this case, as illustrated in FIG. 8, the first display region AR1 on the front side of the observer, the four display regions on the peripheral sides, namely, the two second display regions AR2a and AR2b and the two third display regions AR3x and AR3y, can be visually identified by the observer as if the one connected integrated display region ARG is present. On the other hand, for the display regions each visually identified with one eye, the right eye side-display region ARR visually identified with the right eye of the observer includes the first display region AR1, the second display region AR2a, and the third display regions AR3x and AR3y, and the left eye side-display region ARL visually identified with the left eye of the observer includes the first display region AR1, the second display region AR2b, and the third display regions AR3x and AR3y. Note that, each of the optical systems is disposed so as to generate an image in which the peripheral side (upper side or lower side) of the first display region AR1 and the third display regions AR3x and AR3y are partially superimposed on each other and connected.

Also in Second Exemplary Embodiment, a superimposed region being a joint, namely, a boundary is generated between the adjacent display regions, but visibility of each superimposed region can be sufficiently suppressed by disposing the first display region AR1 on the front side.

Figure 9:
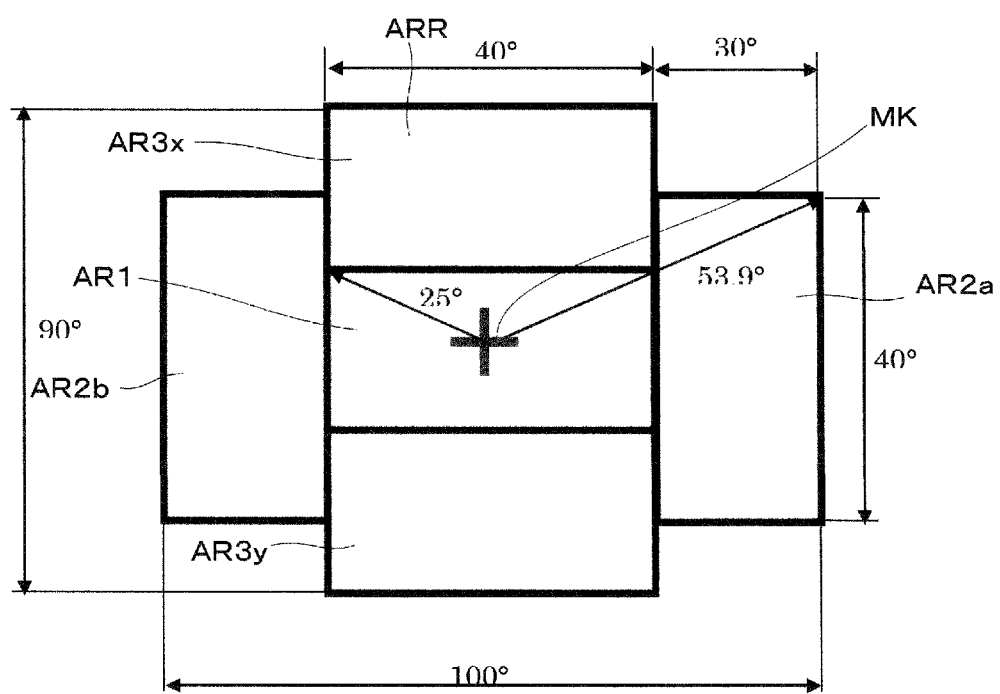
FIG. 9 is a diagram illustrating one example of an angle of view (visual field angle) of the display region.

FIG. 9 is one example numerically illustrating an angle of view in Second Exemplary Embodiment. As in the example of FIG. 9, with a standard position (for example, the center of the cross indicator MK or a position through which a standard visual axis passes) of the observer viewing from the front when being worn as a reference to an angle of view (visual field angle) of 0°, it is assumed that an angle of view (half angle of view) in a diagonal direction is about 25° in the first display region AR1, and an angle of view (full angle of view) in a horizontal direction is about 40° and an angle of view (full angle of view) in a vertical direction is 30°, which is a total of about 90°, in each of the first display region AR1 and the third display regions AR3x and AR3y. Further, it is assumed that an angle of view (full angle of view) in the horizontal direction is about 30° and an angle of view (full angle of view) in the vertical direction is about 40° in each of the second display regions AR2a and AR2b. In this case, for example, a wide angle of view can be achieved such that an angle of view (full angle of view) in the horizontal direction is about 100°, an angle of view (full angle of view) in the vertical direction is about 90°, and an angle of view (half angle of view) in the diagonal direction is about 53.9° in the integrated display region ARG.

Figure 10:
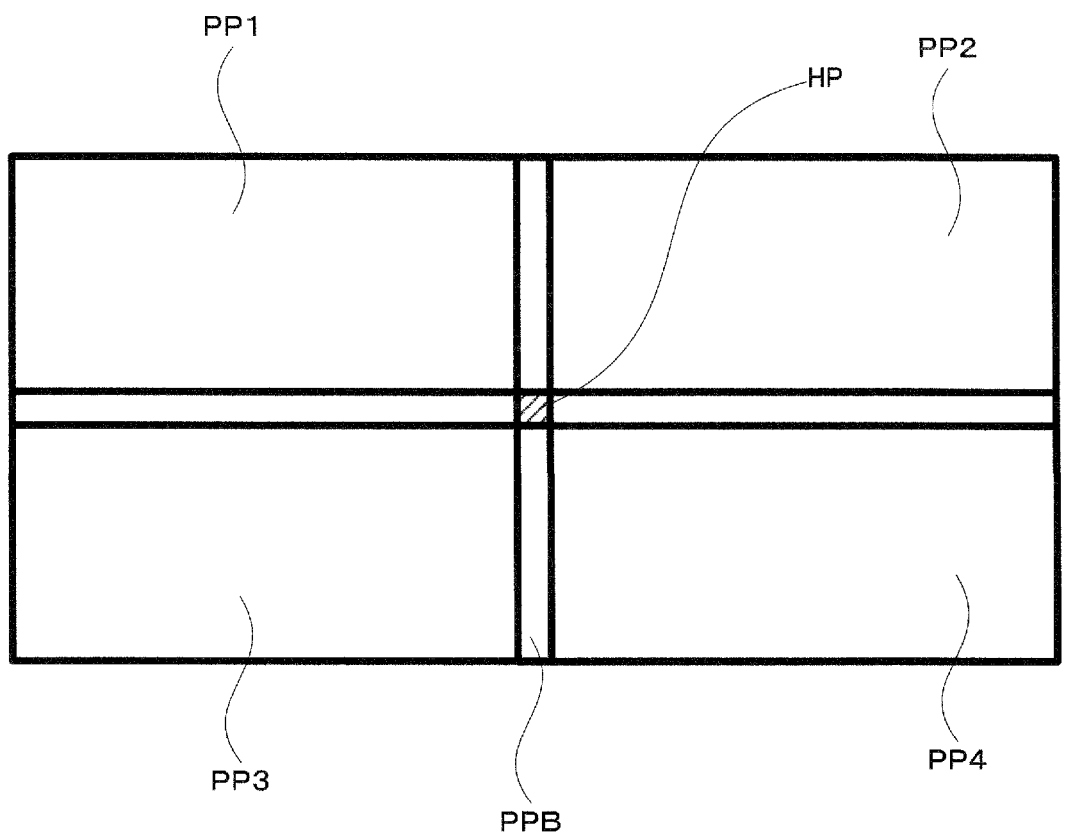
FIG. 10 is a schematic diagram illustrating a state of a display region by a virtual image display device in a comparative example.

Further, in Second Exemplary Embodiment, the four display regions are provided on each of the left and right. From a different viewpoint, the four divided regions are provided. The number of superimposition of a region at an identical place between the display regions is set to be less than or equal to three (three at most). In other words, a place OP indicated by a broken line in FIG. 8 at which the most display regions overlap each other is three in each of the superimposed display regions. For example, as in a comparative example illustrated in FIG. 10, when four rectangular display regions (divided regions) PP1 to PP4 are superimposed on one another, each of the four display regions PP1 to PP4 overlap one another at a place of a hatched portion HP at the center of a cross-shaped superimposed region PPB in FIG. 10. The portion has an influence on visibility when superimposition of light beams is unbalanced between the four regions. Particularly when the place of the hatched portion HP is located in a position having high characteristics of a person's visual field, the portion is more likely to be exceedingly conspicuous. In contrast, in Second Exemplary Embodiment, even when a superimposed region is on the peripheral side and four (or four or more) display regions (divided regions) are also provided, overlapping display regions are set to be three or less in the superimposed region, and thus the superimposed region is prevented from being conspicuous while ensuring flexibility in disposition of each region and avoiding superimposition of many display regions.

Third Exemplary Embodiment

Hereinafter, a virtual image display device in Third Exemplary Embodiment will be described. The virtual image display device in Third Exemplary Embodiment is modified from the virtual image display device in First Exemplary Embodiment and the like, and description of a portion common to that in First Exemplary Embodiment and the like will be omitted.

Figure 11:
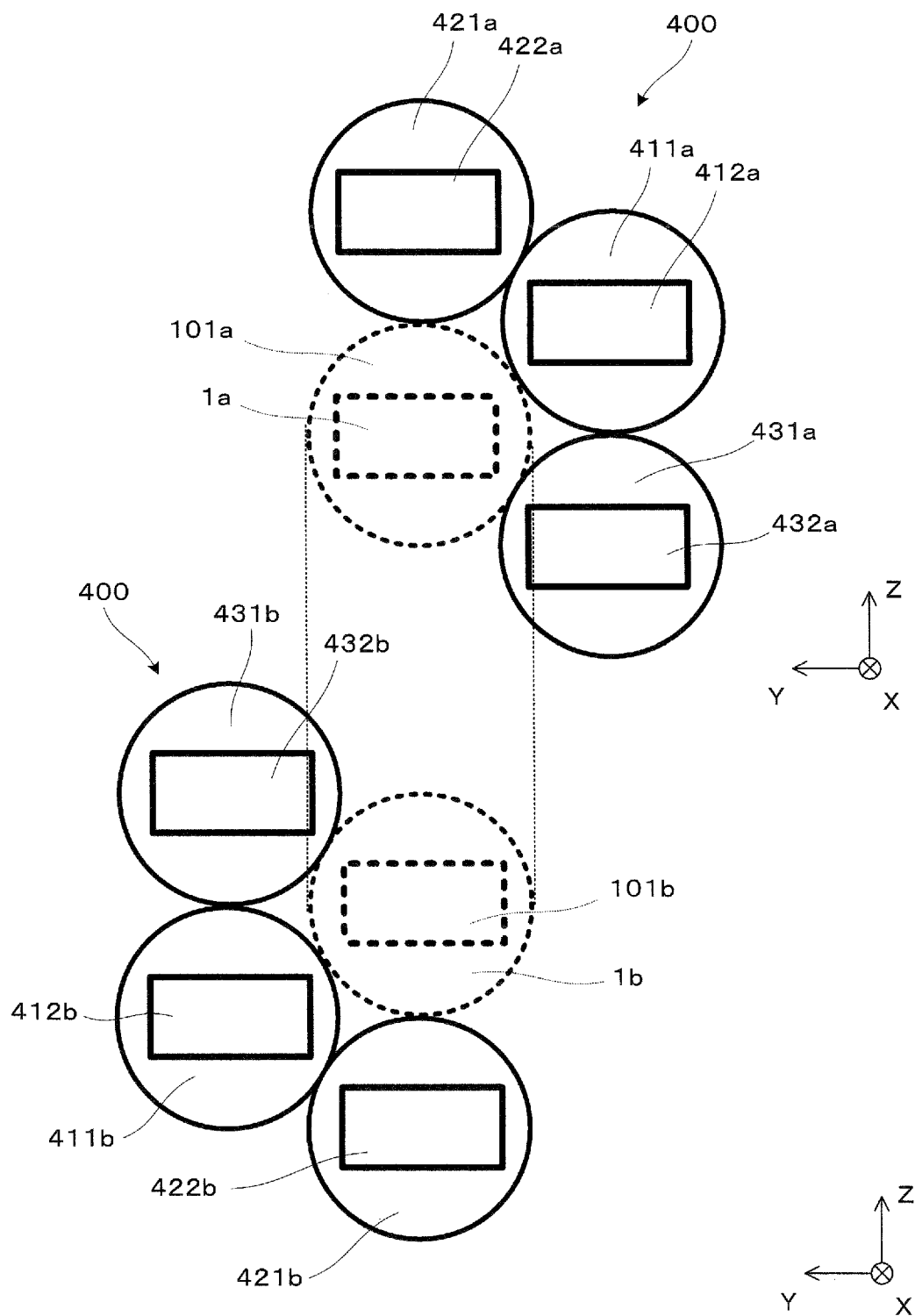
FIG. 11 is a schematic diagram illustrating a state of a virtual image display device in Third Exemplary Embodiment.
Figure 12:
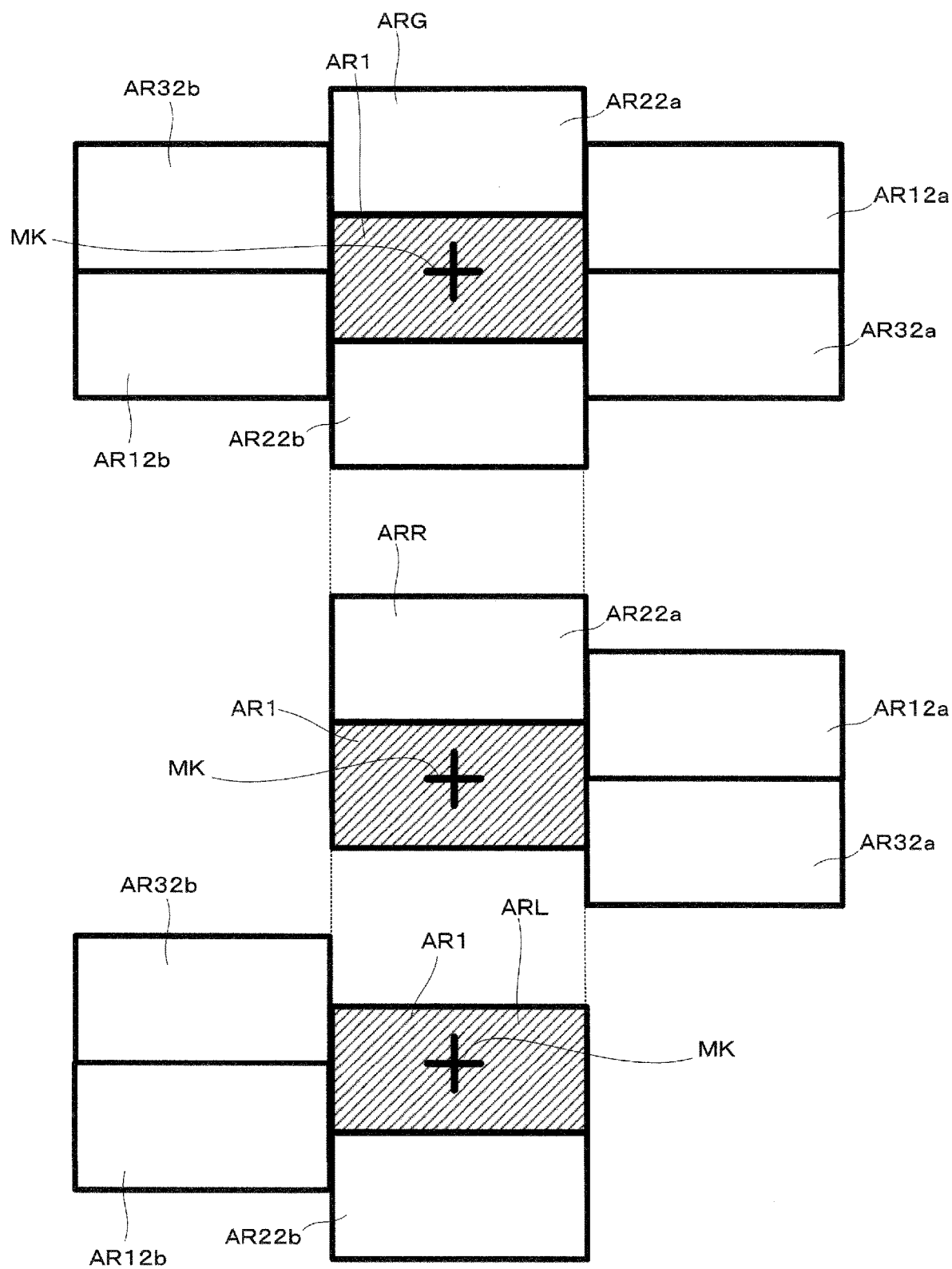
FIG. 12 is a schematic diagram illustrating a state of a display region in the virtual image display device in Third Exemplary Embodiment.

FIG. 11 is a schematic diagram illustrating one example of a state of a virtual image display device in Third Exemplary Embodiment. FIG. 12 is a schematic diagram illustrating one example of a state of a display region in the virtual image display device in Third Exemplary Embodiment. In Third Exemplary Embodiment, as illustrated in FIGS. 11 and 12, a difference is that second display regions that perform individual image display separately on the right eye side and the left eye side each include a plurality of display regions (divided regions) on the left and right.

To describe specifically, first, as illustrated in FIG. 11, a virtual image display device 400 according to Third Exemplary Embodiment includes three respective groups of second display element sections 412a, 422a, and 432a and first ocular optical systems 411a, 421a, and 431a constituting second display elements for a right eye on the peripheral side of the first display element 1a and the first ocular optical system 101a for a right eye indicated by broken lines. Similarly, three respective groups of second display element sections 412b, 422b, and 432b and second ocular optical systems 411b, 421b, and 431b constituting second display elements for a right eye are provided on the peripheral side of the first display element 1b and the first ocular optical system 101b for a left eye indicated by broken lines. As a result, as illustrated in FIG. 12, the observer can visually identify an image as if the integrated display region ARG including the seven display regions are integrated is present. In other words, the first display region AR1 on the front side of the observer, three second display regions AR12a, AR22a, and AR32a and three second display regions AR12b, AR22b, and AR32b being six display regions on the peripheral sides are visually identified as one integrated display region ARG by the observer. Note that, in this case, the right eye side-display region ARR visually identified with the right eye of the observer includes the first display region AR1, the second display regions AR12a, AR22a, and AR32a, and the left eye side-display region ARL visually identified with the left eye of the observer includes the first display region AR1 and the second display regions AR12b, AR22b, and AR32b. The second display regions AR12a, AR22a, and AR32a are displayed by the three groups of the second display element sections 412a, 422a, and 432a. The second display regions AR12b, AR22b, and AR32b are displayed by the three groups of the second display element sections 412b, 422b, and 432b.

Also in Third Exemplary Embodiment, a superimposed region being a joint, namely, a boundary is generated between the adjacent display regions, but visibility of each superimposed region can be sufficiently suppressed by disposing the first display region AR1 on the front side. Further, also in Third Exemplary Embodiment, even when four (or four or more) display regions (divided regions) are provided, overlapping display regions are three or less in the superimposed region, and thus the superimposed region is prevented from being conspicuous while ensuring flexibility in disposition of each region and avoiding superimposition of many display regions.

Further, in the illustration, for the plurality of display element section 412a and the like, for example, the second display element section 412a and the second display element section 422a are arranged on the outer edge side in the lateral direction in which the eyes are aligned, whereas the second display element section 412a and the second display element section 432a are arranged on the outer edge side in the longitudinal direction orthogonal to the lateral direction in which the eyes are aligned. In this way, an image can be formed at a wider angle of view in the lateral direction in which the eyes are aligned and the longitudinal direction orthogonal to the lateral direction.

Other Modified Example and the Like

While the invention have been described above based on Exemplary Embodiments, the invention is not limited to Exemplary Embodiments described above, and the invention may be implemented in various aspects without departing from the purpose of the invention and, for example, the following modifications may be made.

Figure 13:
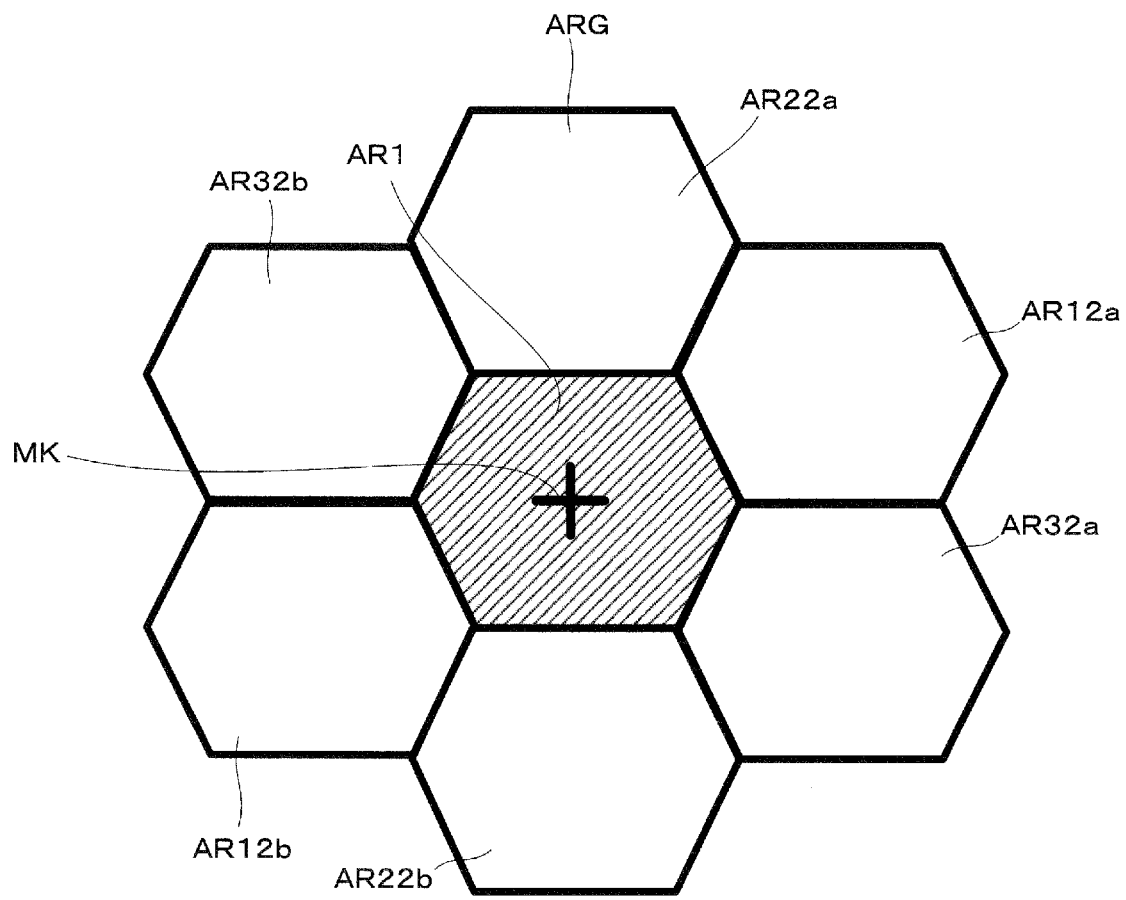
FIG. 13 is a schematic diagram illustrating a state of a display region in a virtual image display device in another one modified example.

First, in the above-described description or illustration, each display region (divided region) is rectangular, that is to say, a display element is configured with a polygonal panel having four vertexes. However, the invention is not limited to this. For example, as a modified example of FIG. 12, as illustrated in FIG. 13, a display element may be configured with or each display region (divided region) may be formed of a polygonal (hexagonal in FIG. 13) panel having four or more vertexes. Further, a display element may be configured with or each display region (divided region) may be formed of a triangular panel having three vertexes.

Figure 14:
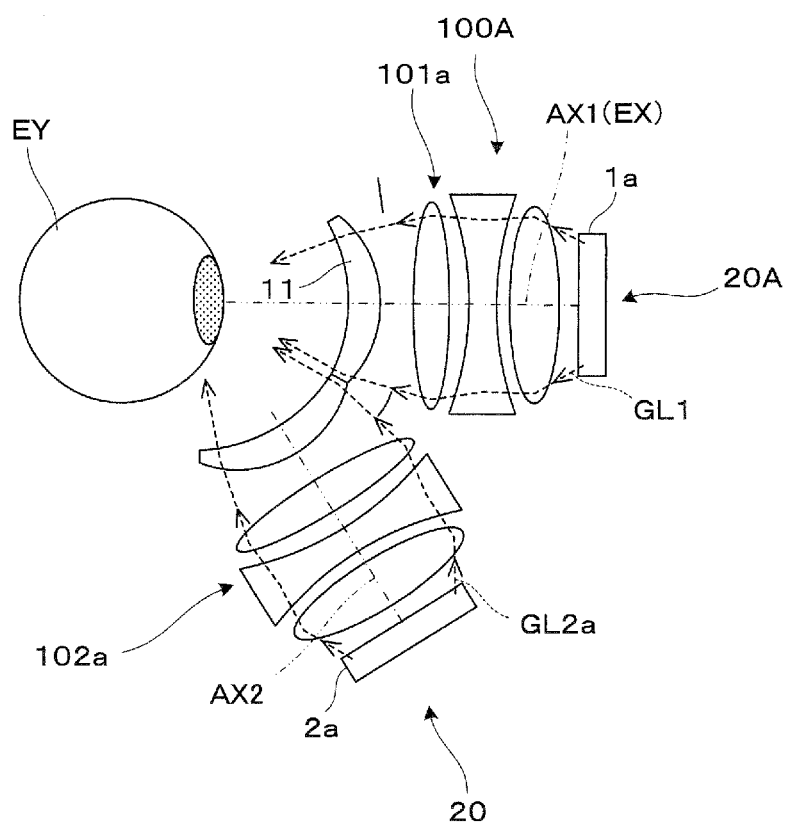
FIG. 14 is a diagram for describing one modified example of a display element and an ocular optical system.

Further, an ocular optical system may also be achieved in various aspects. For example, as illustrated in FIG. 14, a part of a configuration may be connected to an adjacent ocular optical system. In one example illustrated in FIG. 14, the first ocular optical system 101a and the second ocular optical system 102a each include a plurality of lenses and further have an aperture and the like. Optical axes AX1 and AX2 of the respective first and second ocular optical systems 101a and 102a extend in a direction toward the eyes EY of the observer. The optical axis AX1 of the first ocular optical system 101a causing an image on the central side to be visually identified coincides with a reference direction assumed as a visual axis EX of the eyes EY of the observer. Herein, a lens closest to the emission side of the first ocular optical system 101a and the second ocular optical system 102a, that is, a lens on the closest side to the eyes EY of the observer is configured with an integrated emission lens 11.

It is assumed in the above-described description that extraneous light is not directly observed, but extraneous light may be observed with see-through by incorporating the half mirror and the like.

Further, for image display of a common content in the first display region, stereopsis using an angle of convergence by slightly displacing a left image position and a right image position can be achieved while a video content is common except for a case where positions of pixels are completely identical on the left and right sides. In other words, an image having parallax on the left and right sides may be formed.

Further, in Exemplary Embodiments described above, each of the configurations in the optical systems are symmetrical in the left-and-right pairs. However, the invention is not limited to this and other aspects are also conceivable. For example, a display region may be added around on just one of the left and right sides. Specifically, in First Exemplary Embodiment, for example, the above-described four display elements 1a, 2a, 1b, and 2b and four ocular optical systems 101a, 102a, 101b, and 102b are provided, but a configuration in which the second display element 2a and the second ocular optical system 102a among them are not provided or the second display element 2b and the second ocular optical system 102b are not provided is conceivable. In other words, an aspect is conceivable where the second display region is formed on the peripheral side on just one of the left and right sides.

Further, in the description above, a place (boundary portion) being a joint, namely, a boundary is a superimposed region in which a part of a display region is superimposed between adjacent display regions. However, a boundary portion is also conceivably formed between adjacent display regions being connected and aligned without being superimposed on each other. The invention is applicable to a boundary portion without the superimposed place. In other words, even when a place corresponding to the superimposed regions OVR and OVL exemplified in FIG. 3 is a boundary portion without a superimposed place, the boundary portion is prevented from being visually identified by being provided in a position outside the central side.

The entire disclosure of Japanese Patent Application No. 2017-201616, filed Oct. 18, 2017 is expressly incorporated by reference herein.

What is claimed is:

1. A virtual image display device comprising:
a first display element configured to emit image light of a first component corresponding to a first display region on a front side of an observer viewing from the front when being worn;
a second display element configured to emit image light of a second component corresponding to a second display region being partially superimposed on a peripheral side of the first display region, the second display element being located in a horizontal direction from the first display element;
a first ocular optical system configured to emit the image light of the first component emitted from the first display element to a position corresponding to an eye of an observer;
a second ocular optical system configured to emit the image light of the second component emitted from the second display element to a position corresponding to the eye of the observer, wherein
the first display element and the first ocular optical system are part of a pair of configurations provided in association with left and right eyes of the observer,
a pair of the first display elements perform image display of a common content in the first display region, and
the second display element performs individual image display in the second display region; and
third display elements, each third display element being configured to emit image light of a third component corresponding to a third display region partially superimposed on a peripheral side of the first display region, and each third display element being located in a vertical direction from a corresponding first display element, wherein
the third display elements are a pair of configurations provided in association with left and right eyes of the observer, and perform image display of a common content in the third display region.

2. The virtual image display device according to claim 1, wherein the second display element and the second ocular optical system are part of a pair of configurations provided in association with left and right eyes of the observer, and a pair of the second display elements separately perform individual image display in the second display region.

3. The virtual image display device according to claim 1, wherein
the first display region includes a range assumed to be passed through by a visual axis of the observer viewing from the front when being worn.

4. The virtual image display device according to claim 1, wherein
the first display region includes a range assumed as a stable field of fixation of the observer viewing from the front when being worn.

5. The virtual image display device according to claim 4, wherein
a superimposed region or a boundary portion of the first display region and the second display region is disposed on a peripheral side with respect to a range assumed as the stable field of fixation of the observer viewing from the front when being worn.

6. The virtual image display device according to claim 1, wherein
a refresh rate of the first display element is higher than a refresh rate of the second display element.

7. The virtual image display device according to claim 1, wherein
a resolution of the first display element is higher than a resolution of the second display element.

8. The virtual image display device according to claim 1, wherein
a visual field angle characteristic of the second display element is wider than a visual field angle characteristic of the first display element.

9. The virtual image display device according to claim 1, wherein
the first display element and the second display element include a polygonal panel having three or more vertexes.

10. The virtual image display device according to claim 1, wherein
the first display region and the second display region are arranged in a lateral direction in which eyes are aligned with the second display region on an outer edge side.

11. The virtual image display device according to claim 1, wherein
the second display element includes a plurality of display element sections, and
the second display region is formed such that a plurality of divided display regions corresponding to the plurality of display element sections are mutually adjacent with a superimposed region or a boundary portion being provided.

12. The virtual image display device according to claim 11, wherein
the plurality of divided display regions corresponding to the plurality of display element sections are arranged in a lateral direction in which eyes are aligned or a longitudinal direction orthogonal to the lateral direction in which eyes are aligned.

13. The virtual image display device according to claim 1, wherein
the number of display regions superimposed at an identical place between the display regions is less than or equal to three.

14. The virtual image display device according to claim 1, wherein
the first display element and the second display element are any of an organic EL display device, a liquid crystal display device, and a laser scan-type display device.

* * * * *